US008696363B2

(12) United States Patent
Gray et al.

(10) Patent No.: US 8,696,363 B2
(45) Date of Patent: Apr. 15, 2014

(54) METHOD AND APPARATUS FOR SIMULATION OF AN ENDOSCOPY OPERATION

(75) Inventors: Roger Leslie Gray, Southend-on-Sea (GB); Ian Michael Ross, Leigh-on-Sea (GB); Stuart Malcolm Greengrass, Great Wakering (GB); Daniel Mark Wallaker, Great Wakering (GB)

(73) Assignee: KeyMed (Medical & Industrial Equipment) Limited, Essex (GB)

( * ) Notice: Subject to any disclaimer, the term of this patent is extended or adjusted under 35 U.S.C. 154(b) by 1689 days.

(21) Appl. No.: 10/491,274

(22) PCT Filed: Oct. 1, 2002

(86) PCT No.: PCT/GB02/04436
§ 371 (c)(1),
(2), (4) Date: Mar. 31, 2004

(87) PCT Pub. No.: WO03/030128
PCT Pub. Date: Apr. 10, 2003

(65) Prior Publication Data
US 2004/0248072 A1 Dec. 9, 2004

(30) Foreign Application Priority Data
Oct. 2, 2001 (GB) .................................. 0123643.9

(51) Int. Cl.
G09B 23/28 (2006.01)
(52) U.S. Cl.
USPC ........... 434/267; 434/262; 434/268; 434/272; 434/275

(58) Field of Classification Search
USPC .......................................................... 434/262
See application file for complete search history.

(56) References Cited

U.S. PATENT DOCUMENTS

| 5,957,694 | A  | * | 9/1999  | Bunch ........................... 434/262 |
| 6,024,576 | A  | * | 2/2000  | Bevirt et al. .................. 434/262 |
| 6,110,079 | A  | * | 8/2000  | Luedke et al. .................. 482/83 |
| 6,428,323 | B1 | * | 8/2002  | Pugh ............................ 434/274 |
| 6,470,302 | B1 | * | 10/2002 | Cunningham et al. ............ 703/7 |
| 6,544,041 | B1 | * | 4/2003  | Damadian ..................... 434/262 |
| 6,705,871 | B1 | * | 3/2004  | Bevirt et al. .................. 434/262 |

(Continued)

FOREIGN PATENT DOCUMENTS

| GB | 2 252 656    | 8/1992 |
| WO | WO 99 38141  | 7/1999 |
| WO | WO 99 39315  | 8/1999 |
| WO | WO 99 39317  | 8/1999 |

OTHER PUBLICATIONS

Pearse R G. Percutaneous catheterisation of the radial artery in newborn babies using transillumination. Arch Dis Child. Jul. 1978; 53(7): 549-54.*

(Continued)

Primary Examiner — Nikolai A Gishnock
(74) Attorney, Agent, or Firm — Luedeka Neely Group, P.C.

(57) ABSTRACT

An apparatus for simulation of an endoscopy operation. A dummy endoscope (1) is inserted into a unit (2) which monitors the position of the dummy instrument and provides force feedback to the instrument in accordance with a stored software model. A virtual image simulating the view from the endoscope is displayed. Additional simulation is provided of an external condition to the patient body, for example patient orientation (8), external pressure applied to the body (9), (10) and trans-illumination (11).

7 Claims, 3 Drawing Sheets

(56) References Cited

U.S. PATENT DOCUMENTS

| | | | |
|---|---|---|---|
| 6,726,638 B2* | 4/2004 | Ombrellaro | 600/587 |
| 6,926,531 B2* | 8/2005 | Wallaker | 434/262 |
| 6,939,138 B2* | 9/2005 | Chosack et al. | 434/262 |
| 2001/0019818 A1* | 9/2001 | Yong | 434/262 |
| 2003/0091967 A1* | 5/2003 | Chosack et al. | 434/262 |
| 2004/0009459 A1* | 1/2004 | Anderson et al. | 434/262 |
| 2004/0183777 A1* | 9/2004 | Bevirt et al. | 345/156 |
| 2004/0254771 A1* | 12/2004 | Riener et al. | 703/7 |
| 2004/0257438 A1* | 12/2004 | Doguchi et al. | 348/65 |
| 2006/0029917 A1* | 2/2006 | Sui | 434/262 |
| 2006/0040245 A1* | 2/2006 | Airola et al. | 434/262 |
| 2006/0073458 A1* | 4/2006 | Ehrhardt et al. | 434/262 |
| 2006/0194180 A1* | 8/2006 | Bevirt et al. | 434/262 |

OTHER PUBLICATIONS

UK Search Report for Application No. PCT/GB02/04436 dated Nov. 25, 2002 (2 pages).

* cited by examiner

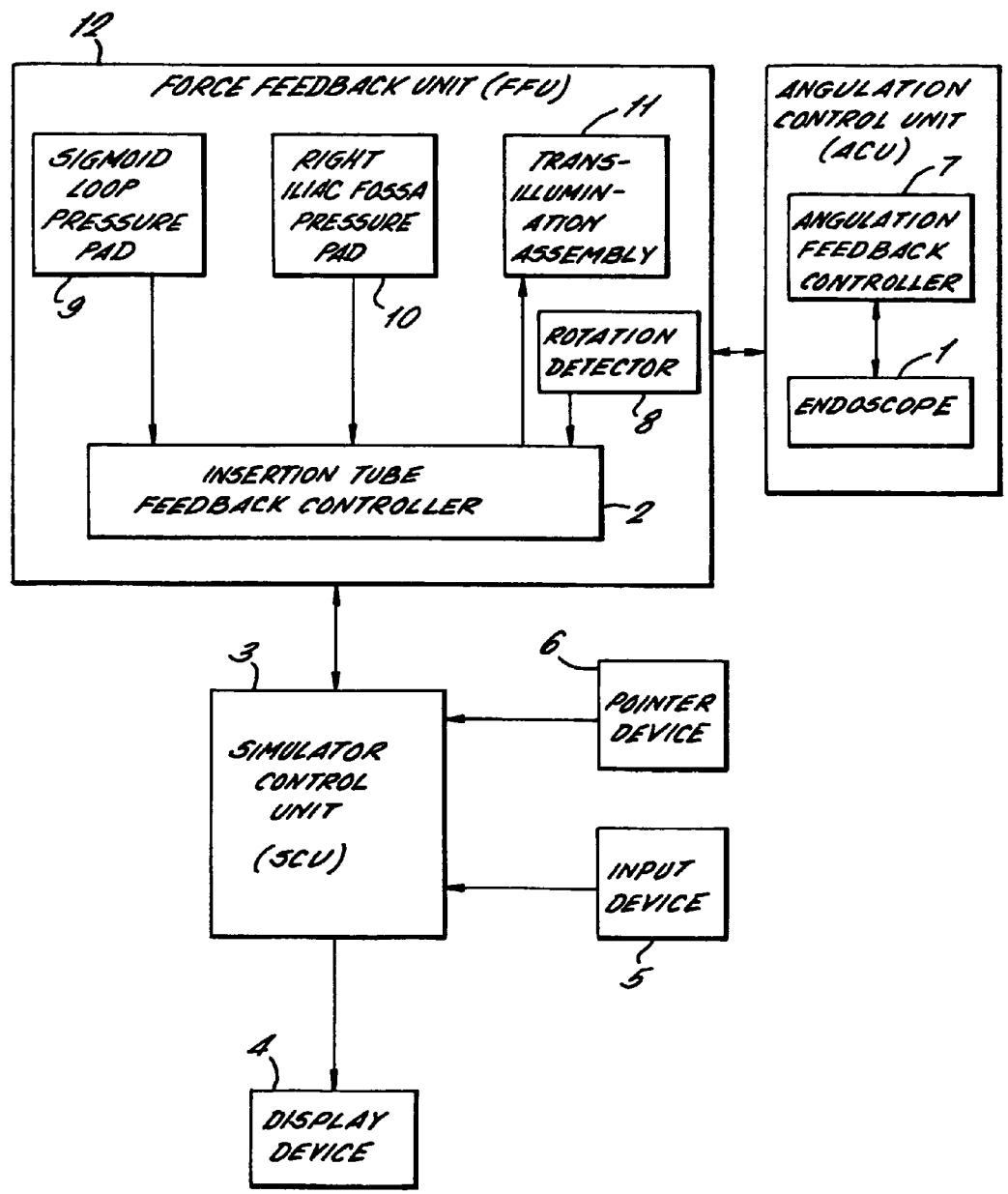

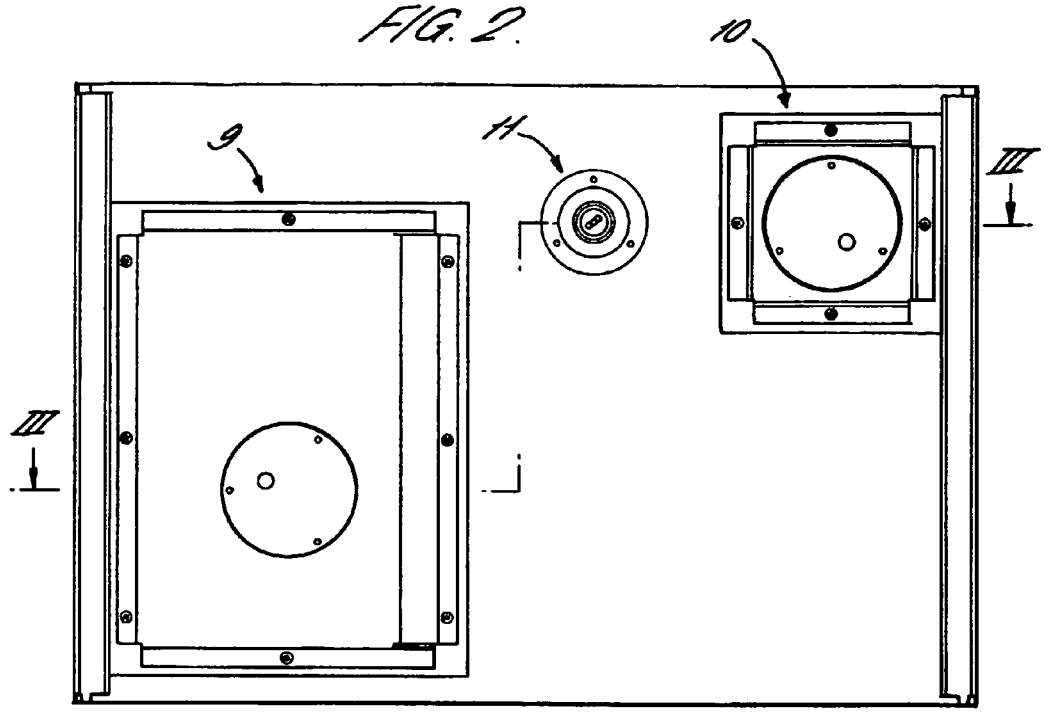
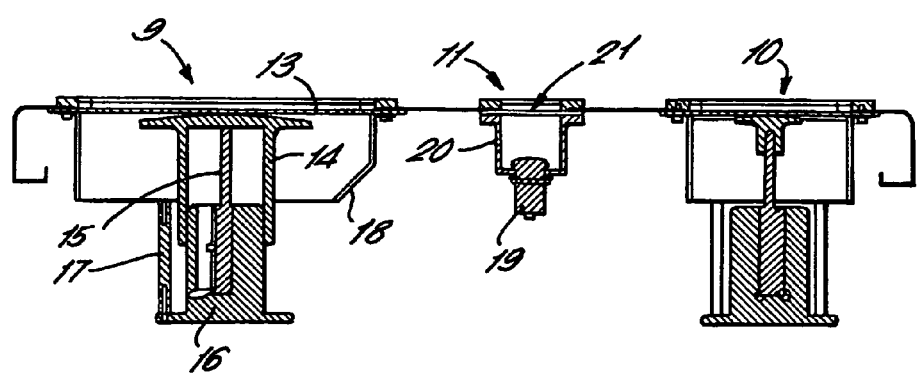

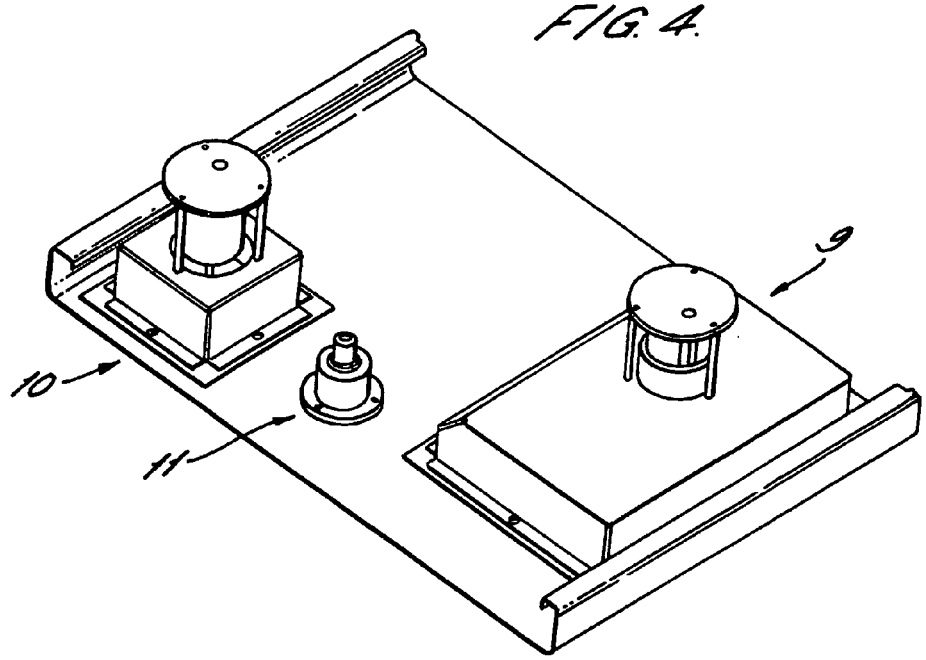
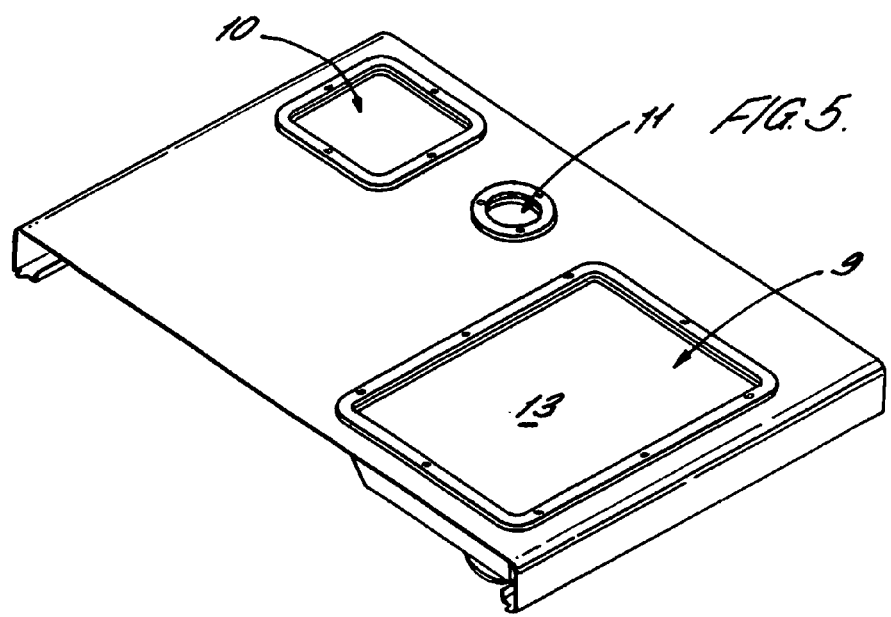

METHOD AND APPARATUS FOR SIMULATION OF AN ENDOSCOPY OPERATION

This invention relates to apparatus for use in training an operator in the use of an endoscope system comprising a dummy endoscope having an insertion tube; a fixture defining a duct receiving in use the insertion tube; sensor means responsive to manipulation of the dummy endoscope to produce signals representative of longitudinal and rotational movement of the insertion tube relative to the fixture, and simulation means responsive to the signals to generate an operator viewable image simulating the image which would be viewable using the endoscope when manipulated in like manner during an endoscopic procedure wherein the simulation means comprises tactile means operable between the fixture and the insertion tube so as to provide corresponding tactile feedback to the operator. Such an apparatus will subsequently be referred to as of the kind described.

An apparatus of the kind described is disclosed in GB-A-2252656. This is used to provide an operator with the experience of using a real endoscope by simulating how it would feel when manipulated in a particular way during a particular endoscopic procedure. The operator can thus gain experience at co-ordinating visual and tactile information during the simulation.

The apparatus is capable of providing good basic training to an unskilled operator. However, procedures such as colonoscopy are highly skilled operations in which the operator can encounter all manner of conditions as the anatomy of the colon can be very different from one patient to another. There is therefore a need for a simulator which can provide more sophisticated modelling of the endoscopy process to allow the simulator to be used to train more experienced operators in more advanced techniques.

According to a first aspect of the present invention an apparatus of the kind described is provided with an operator interface allowing simulation of an external condition of the patient body while the dummy endoscope is being manipulated in the fixture.

By allowing an external condition of the patient body to be simulated during the internal simulation process, the invention provides a degree of realism not available in the prior art. The apparatus is preferably for simulating an endoscopic process carried out on an existing body orifice, rather than an incision made in the body.

In one preferred aspect, the operator interface is an input allowing the user to input information relating to an external condition of the patient body.

This external condition may be, for example, the orientation of the patient body. In colonoscopy, it is normal for the colonoscopist to begin insertion of the endoscope with the patient lying on his left side (known as the left lateral position). Once the endoscope reaches the splenic flexure, moving the patient to the right lateral position rounds off the splenic flexure allowing the endoscope to pass more easily. Indeed, a skilled colonoscopist may frequently turn a patient between various positions if he is experiencing difficulty inserting the endoscope with the patient in a particular position. By providing an interface allowing the user to input information relating to the orientation of the patient body, it is possible to mimic the effects of turning the patient and for the effects of this to be displayed as the viewable image, as well as ensuring that the tactile means reacts accordingly.

The input can take any form such as a keyboard or mouse input. However, one way of providing greater realism is for the input to be provided by the fixture being rotatable with a sensor being provided to determine the rotational orientation of the fixture. The fixture may be designed to mimic the appearance of a human torso.

In its simplest form, the simulation means may assume that the cavity being probed is a fixed structure which does not vary depending upon its orientation. However, in the case of colonoscopy, the shape of the colon varies greatly as the patient is turned owing to the effects of gravity. Therefore, for added realism, particularly in the case of colonoscopy, the simulation means is preferably provided with means to vary the viewable image and the tactile feedback to simulate the effects of gravity depending upon the orientation of the body determined from the operator interface. Thus, as the apparatus simulates a patient being turned, the image that the operator sees will vary as it would in practice and the tactile feedback is adjusted accordingly. Ideally, the viewable image will be a real time image which is continuously updated to simulate the real life situation of a patient being turned.

As an alternative or in addition to simulating the orientation of the patient, the external condition may be the deformation of the body caused by external pressure. Because the colon is in part a very mobile and elastic organ which can move in three dimensions during colonoscopy, it is sometimes helpful for an operator to apply pressure from outside the abdomen to restrict movement of the colon and endoscope and help to guide its tip further into the colon. Also, finger pressure is often used to confirm that the tip of the endoscope has reached the caecum which generally signifies that examination has been completed. By simulating the deformation of the body caused by external, pressure, these conditions can be simulated. As with the orientation of the patient, the input can be any known input such as a keyboard or mouse. The greatest realism is provided by the input being one or more pressure pads which may be incorporated into an anatomical model.

According to a second aspect of the invention, there is provided an apparatus for use in training an operator in the use of an endoscope system comprising a dummy endoscope having an insertion tube; a fixture defining a duct receiving in use the insertion tube; sensor means responsive to manipulation of the dummy endoscope to produce signals representative of longitudinal and rotational movement of the insertion tube relative to the fixture; and simulation means responsive to the signals to generate an operator viewable image simulating the image which would be viewable using the endoscope when manipulated in like manner during an endoscopic procedure wherein the simulation means comprises tactile means operable between the fixture and the insertion tube so as to provide corresponding tactile feedback to the operator, and an operator interface allowing simulation of one or more external conditions of the patient body while the dummy endoscope is being manipulated in the fixture; wherein the operator interface allows the user to determine the position of the dummy endoscope from a signal simulating an external condition, the operating interface being a light arranged to simulate the appearance of a light on the endoscope as it would be seen in practice through the wall of the abdomen.

This is intended to simulate a condition known as transillumination. This is a way of confirming that the endoscope has proceeded as far as the caecum. This is done by angulating the tip of the endoscope anterially which should, if the endoscope is fully inserted into the caecum, allow the light from the endoscope to transilluminate the abdominal wall at the right iliac fossa. This is simulated as the operator interface is a light arranged to simulate the appearance of a light from the endoscope as it would be seen in practice through the wall of the abdomen. Again, the greatest realism is provided by the light being seen through the wall of an atomical model.

The invention also extends to the method of operating the apparatus as described above.

An example of the method an apparatus in accordance with the present invention will now be described with reference to the accompanying drawings, in which:

FIG. 1 is a schematic diagram showing the overall system layout;

FIG. 2 is an underneath plan of the cover of the main feedback unit showing only those components which are new to the present invention;

FIG. 3 is a cross-section through line in FIG. 2;

FIG. 4 is an underneath perspective view of the cover of the feedback unit shown in FIG. 2; and FIG. 5 is a top perspective view of the cover of the feedback unit.

Most of the training apparatus is as described in GB-A-2252656 and is now well known in the art. Therefore, a further detailed description will not be given here.

The apparatus consists of a dummy endoscope 1 having an insertion tube which is inserted into an insertion tube feedback controller 2. The feedback controller 2 has detectors to detect the linear and angular position of the endoscope insertion tube, as well as a mechanism for generating a force feedback on the endoscope insertion tube under the control of simulator control unit 3. The simulator control unit 3 monitors the signals from the insertion tube feedback controller 2 to determine the position of the endoscope with respect to a computer generator model of a colon stored in its memory. This data is also used to provide visual representation of the endoscope within the colon which is displayed on display device 4 and which is coordinated with the force feedback to the endoscope insertion tube. Signals are received from a control panel 5 and a pointer device 6 allowing the user to interface with the system.

The endoscope 1 has an angulation feedback controller 7 which in a real endoscope is a pair of wheels which are connected via guide wires to the tip of the endoscope. Rotation of the wheels changes the orientation of the tip of the endoscope. In the simulated endoscope, these wires are not connected to the tip of the endoscope so that no physical movement of the tip of the endoscope occurs. Instead, the wires are connected to position detectors and to feedback motors in angulation feedback controller 7, such that simulated angular position of the endoscope tip is detected by the simulator control unit and the image displayed and the force feedback are generated accordingly.

As described thus far, the apparatus is as disclosed in GB-A-2252656. Further modifications to the system may be provided. For example, there may be a facility to simulate various instruments which are inserted within the endoscope. This requires a dummy instrument, a position detector, and a means of representing the instrument visually in the software model stored in the memory of the simulator control unit 3. It is also possible to provide force feedback to the instrument. Conventional endoscopes also have a means of pumping air along the endoscope to inflate a body cavity and a means to suck fluid from the body cavity. Again, this can be simulated by appropriate position detectors and feedback mechanisms on the various endoscopes buttons which control these functions, and again by making allowances for these operations in the software.

The improvement provided by the present invention is to provide an operator interface allowing simulation of an external condition of the patient's body.

This may, for example, take the form of one or more of a rotation detector 8, a sigmoid loop pressure pad 9, a right iliac fossa pressure pad 10, or a trans-illumination assembly 11. These, together with the insertion tube feedback controller 2 are housed in a force feedback unit 12 which is shown in greater detail in FIGS. 2 to 5. It should be noted that these figures show only the cover of the unit, and show only those components which are new to the present invention. In practice, all of the mechanisms to detect the position of the dummy endoscope and to provide force feedback to the endoscope will be provided in this unit.

The rotation detector 8 may be provided by making the entire casing of the main feedback unit rotatable and by providing a detector to detect this rotational movement and convey this information to the simulator control unit 3. The software can re-orientate the image accordingly. To provide more sophisticated modelling, the software can simulate the effect of gravity on the position of the colon. As an alternative to the entire casing being rotatable, it may be more convenient to provide a rotatable knob on the casing which is turned by a user to simulate turning the patient, or the rotation can be simulated by keyboard or mouse operation.

The sigmoid loop pressure pad 9 and right iliac fossa pressure pad 10 have similar construction, and only the sigmoid loop pressure pad is described below. The right iliac fossa pad 10 is considerably smaller than the sigmoid loop pressure pad 9, but functions in the same way.

The covering of the sigmoid loop pressure pad 9 is a rubber skin 13 backed by a layer of foam so as to simulate to a degree the actual skin/fat layer of the patient. Directly below this "skin" is a plunger 14 which is designed to spread the load of the applied force. The plunger is arranged to displace one element of a linear potentiometer 15 which is spring loaded to return the plunger to its original position when the force is removed. The potentiometer is supported on a housing 16 which is supported via spacers 17 on a support member 18 attached to the back of the cover.

The pressure pad 13 is sized to simulate the area of the abdomen directly over the sigmoid colon. When the pad 13 is pressed, the simulator can determine amount of pressure from the linear potentiometer 15 and can simulate the effect of this pressure on the geometry of the sigmoid colon which will have the effect in practice of reducing the amount of endoscope looping.

The trans-illumination assembly 11 essentially comprises an extra bright red LED 19 mounted in a housing 20 and covered with a silicon sheet 21. This is designed to simulate a known endoscopic technique in which, once the caecal region has been reached, the tip of the endoscope can be manoeuvred into a position in which the light emitted by the endoscope is visible through the skin. This confirms to the operator that the endoscope is in the desired position. Once the software determines from the sensors for detecting the position of the endoscope tip that the endoscope is in the required position, the bright LED 11 can be lit. The degree of illumination can be controlled depending upon the simulated proximity of the tip to the colon wall and its position in relation to the caecal region.

Although the casing has been shown having a cover which is a flat plate, it is possible for this to be designed so as to represent the human body. In this case, the pads 9 and 10 and the trans-illumination assembly 11 are placed in the appropriate position on the simulated body.

The invention claimed is:

1. An apparatus for use in training an operator in the use of an endoscope system comprising:
   a dummy endoscope having an insertion tube;
   a fixture defining a duct receiving in use the insertion tube, the dummy endoscope being manipulated by the operator;

sensor means responsive to manipulation of the dummy endoscope for producing signals representative of longitudinal and rotational movement of the insertion tube relative to the fixture; and simulation means responsive to the signals for generating an operator viewable image simulating the image which would be viewable using an actual endoscope when the actual endoscope is used in an actual endoscopic procedure and is manipulated like the dummy endoscope, wherein the simulation means comprises tactile means operable between the fixture and the insertion tube so as to provide corresponding tactile feedback to the operator, and an operator interface producing input information in response to external physical manipulation of the operator interface applied by the operator while the insertion tube is received in the fixture, the external physical manipulation corresponding to a force required to deform a patient body, the simulation means being operable to receive the input information and relate it to deformation of a patient body caused by the external physical manipulation which is separate from any pressure exerted by the dummy endoscope on the patient body, the simulation means being further operable to simulate the deformation of an actual patient body that would be caused by the physical manipulation and modify the viewable image and the force feedback based on the simulated deformation of the patient body thereby simulating the changed viewable image that would be seen through an endoscope if an actual patient had received the physical manipulation.

2. An apparatus according to claim 1 wherein the operator interface is provided by one or more pressure pads.

3. A training apparatus for training a person to use an endoscopic system, the apparatus comprising:
a dummy endoscope including an insertion tube;
a fixture defining, in part, a duct for receiving the insertion tube, the fixture including the one or more insertion tube detectors to detect the linear and angular position of the insertion tube and produce position signals corresponding the linear and angular position;
an angulation feedback controller, the angulation feedback controller for generating a force feedback on the insertion tube;
a simulator control unit for monitoring the position signals, for producing a computer generated model of a colon, responsive to the position signals to generate an operator viewable image simulating the image of an actual colon which would be viewable using an actual endoscope when the actual endoscope is used in an actual endoscopic procedure and is manipulated like the dummy endoscope, for determining the position of the dummy endoscope with respect to the computer generated model of a colon and for controlling the force feedback generated by the angulation feedback controller;
a display device for displaying the operator viewable image; and
an operator interface for simulating an external condition of a patient body while the dummy endoscope is located in the duct of the fixture, the operator interface including at least a first pressure pad for receiving a force applied by an operator, the first pressure pad including a first simulated skin surface layer and a first sensor connected to sense the force exerted on the first pressure pad, which is a sensed amount of force, and being connected to communicate the sensed amount of force on the first pressure pad to the simulator control unit; the simulator control unit being responsive to the sensed amount of force to modify the force feedback on the insertion tube and the view of the colon based at least in part on the force placed on the first pressure pad and the computer generated model of a colon.

4. The training apparatus of claim 3 wherein the operator interface further comprises a rotation detector for detecting and transmitting information indicating rotational movement of the fixture and being connected to communicate the rotational movement of the fixture to the simulator control unit.

5. The training apparatus of claim 3 wherein the operator interface further comprises a trans-illumination assembly including a light covered with a sheet, the simulator control unit being connected to control the light based on the simulated position of the insertion tube in the computer generated model of a colon to simulate the appearance of a light from an endoscope in a colon as it would be seen in practice through the wall of an abdomen.

6. The training apparatus of claim 3 wherein the operator interface further comprises a second pressure pad including a second simulated skin surface layer and a second sensor connected to sense the amount of force exerted on the second pressure pad and being connected to communicate the sensed amount of force on the second pressure pad to the simulator control unit.

7. A training apparatus for training a person to use an endoscopic system, the apparatus comprising:
a dummy endoscope including an insertion tube and an angulation feedback controller, the angulation feedback controller including one or more feedback motors for generating a force feedback on the insertion tube;
a fixture defining, in part, a duct for receiving the insertion tube, the fixture including detectors to detect the linear and angular position of the insertion tube and produce position signals corresponding to the linear and angular position;
a simulator control unit including memory storage for storing a computer generated model of a colon, the simulator control unit for monitoring the position signals to determine the position of the dummy endoscope within the fixture and relate the position of the dummy endoscope within the fixture to a virtual position within the computer generated model of a colon and for controlling the force feedback generated by the angulation feedback controller, the simulator control unit being responsive to the position signals to generate an operator viewable image simulating the image of an actual colon which would be viewable using an actual endoscope when the actual endoscope is used in an actual endoscopic procedure and is manipulated like the dummy endoscope;
a display device for displaying the operator viewable image of a colon;
a control panel and a pointer device for a user to interface with the training apparatus; and
an operator interface for simulating an external condition of a patient body while the dummy endoscope is located in the duct of the fixture, the operator interface including the following devices:
a sigmoid loop pressure pad sized to simulate the area of an abdomen above the sigmoid colon, the sigmoid loop pressure pad for receiving a first force from an operator and including a first simulated skin surface layer, a first plunger disposed to receive first input forces from the first skin surface layer and move in response to the first input forces, and a first sensor connected to sense the position of the first plunger and being connected to communicate the position of the plunger to the simulator control unit, a right iliac fossa pressure pad sized to simulate the area of an abdomen above the right iliac fossa, the right iliac fossa pressure pad for receiving a second force from the operator and including a second simulated skin surface layer, a second plunger disposed to receive second input forces from the second simulated skin surface layer and move in response to the second input forces, and a second sensor connected to sense the position of the second plunger and being connected to communicate the position of the plunger to the simulator control unit;

a trans-illumination assembly including a light covered with a sheet and mounted on a third housing, the simulator control unit being connected to control the light based on the simulated position of the insertion tube in the computer generated model of a colon to simulate the appearance of a light from an endoscope as it would be seen in practice through the wall of the abdomen; and a rotation detector for receiving input indicating rotational movement of the fixture and being connected to communicate the rotational movement of the fixture to the simulator control unit;

the simulator control unit being responsive to the input devices to simulate one or more effects on a geometry of the colon shown in the operator viewable image of a colon caused by the first and second forces applied to the pressure pads and to modify the force feedback on the insertion tube based at least in part on the first and second forces placed on the input devices and the computer generated model of a colon.

* * * * *